United States Patent [19]

Penney

[11] Patent Number: 4,940,471

[45] Date of Patent: Jul. 10, 1990

[54] DEVICE FOR CLEANING TWO-STAGE ELECTROSTATIC PRECIPITATORS

[76] Inventor: Gaylord W. Penney, 216 Paris Rd., Pittsburgh, Pa. 15235

[21] Appl. No.: 398,483

[22] Filed: Aug. 25, 1989

Related U.S. Application Data

[63] Continuation-in-part of Ser. No. 36,130, Apr. 3, 1987, Pat. No. 4,861,356, which is a continuation-in-part of Ser. No. 735,566, May 17, 1985, abandoned.

[51] Int. Cl.[5] .......................................... B01D 3/00

[52] U.S. Cl. .......................................... 55/120; 55/138; 55/294

[58] Field of Search .................. 55/137, 138, 117, 120, 55/294

[56] References Cited

U.S. PATENT DOCUMENTS

| | | | |
|---|---|---|---|
| 2,516,680 | 7/1950 | Culpepper | 55/294 |
| 3,233,391 | 2/1966 | Olsen | 55/294 |
| 3,988,127 | 10/1976 | Schumann | 55/117 |
| 4,509,961 | 4/1985 | Jones | 55/294 |
| 4,861,356 | 8/1989 | Penney | 55/137 |

FOREIGN PATENT DOCUMENTS

| | | | |
|---|---|---|---|
| 54-36674 | 3/1979 | Japan | 55/120 |

*Primary Examiner*—Bernard Nozick

*Attorney, Agent, or Firm*—Reed Smith Shaw & McClay

[57] ABSTRACT

An improved device is provided for cleaning particles from the plates of a two-stage electrostatic precipitator using a small stream of high velocity air which is moved over the face of the collecting cell. The cleaning device can operate without disturbing the normal operation of the precipitator. The improved cleaning device using a vacuum stream of air is particularly useful in a two-stage gas-cleaning electrostatic precipitator having a close-spaced collecting stage wherein the high voltage low voltage plates are spaced very close together, typically about 0.0625 inches apart.

6 Claims, 7 Drawing Sheets

DEVICE FOR CLEANING TWO-STAGE ELECTROSTATIC PRECIPITATORS

CROSS-REFERENCE TO RELATED APPLICATIONS

This is a continuation-in-part of copending patent application Ser. No. 36,130 filed Apr. 3, 1987, now U.S. Pat. No. 4,861,356 which was a continuation application of Ser. No. 735,566 filed on May 17, 1985, now abandoned.

FIELD OF THE INVENTION

The present invention relates to a two-stage gas-cleaning electrostatic precipitator for removing particles from a gas. More particularly, it relates to a device for cleaning the collecting cell of a two-stage electrostatic precipitator.

BACKGROUND OF THE INVENTION

A two-stage gas-cleaning electrostatic precipitator usually consists of an ionizing stage, a collecting stage and a fan for causing the particle laden gas to pass through the ionizing stage and then through the collecting stage. The particles to be removed from the gas are ionized or given a charge when the gas passes through the ionizing stage. The charged particles pass into the collecting stage where they are precipitated. The precipitation occurs because there is a voltage gradient in the spaces between the plates of the collecting stage which acts on the charged particles, moving them to the plates and thus out of the gas stream. Once the particles are precipitated in the collecting stage they must be removed from the plates so that more particles can be collected.

U.S. Pat. No. 2,911,060 describes a cleaning system for continuously removing particles from the collecting surface of a large single-stage electrostatic precipitator. The system uses a hood which draws gas from the single-stage precipitator compartment. The cleaning air, drawn through the hood passes to a hopper where the gas velocity is so low that the removed dust can settle. An induced draft fan draws air from the hopper and either returns it to the inlet of the precipitator or passes it through other undescribed cleaning apparatus before exhausting it to the atmosphere.

U.S. Pat. No. 2,701,622 also shows a system for cleaning a single-stage electrostatic precipitator which rotates the precipitator passed the cleaning air duct. Collected dust is blown from the precipitator by the cleaning air and is collected in a cyclone type after-collector. The patent teaches that the cleaning air is maintained at a high temperature and is recirculated from the after-collector through the cleaning air duct to the precipitator.

Both of these patents are directed to single-stage precipitators which cannot be used for ventilating air because of ozone generation and which are typically used to collect high dust loadings. Moreover, the above patents appear to use relatively low plate cleaning air velocities, on the order of 3500 ft/min, although no numbers are actually given, which would be ineffective in cleaning the plates of a two-stage electrostatic precipitation.

As compared to a single-stage electrostatic precipitator, a two-stage electrostatic precipitator is a much smaller device, uses less power, and can be made to generate only a minute amount of ozone so that it can be used to clean ventilating air. One serious drawback, however, is that the collected particles cannot be held onto the collecting plates electrically but are held on only by adhesion. With dry particulates, the adhesion property varies dramatically depending upon the composition of the particulates. This has seriously limited the field of application of two-stage electrostatic precipitators.

Another drawback is the low dust holding capacity of two-stage precipitators. To a first approximation, a given cleaning capacity measured in cubic feet per minute (CFM) requires a given particle or dust collecting area. Reducing the spacing between electrodes as described in U.S. Pat. No. 2,129,783 not only reduces the size of a two-stage precipitator, but also reduces the dust holding capacity. Consequently, a two-stage electrostatic precipitator, typically, has been used only for relatively low particle loadings except for the case of oil droplets where the collected liquid can continuously drain from the collecting electrodes.

Typically, two-stage electrostatic precipitators are operated with a gas velocity at the face of the collecting section of 300–400 ft/min. At this gas velocity and with high particle loadings the collecting section will require frequent cleaning. Normally this is done by shutting down the precipitator and removing the collecting section for cleaning with water. But washing requires a period for drying before voltage can be reapplied so washing is not an acceptable cleaning method for maintaining high efficiency. A preferable cleaning mechanism would be one which can function effectively during the operation of the precipitator without shutting it down.

U.S. Pat. No. 2,672,947 shows a cleaning system in a two-stage precipitator which does not require the shutting down of the gas flow. However, this system requires that the collecting sections have a total cross sectional area for gas flow which is greater than that of the gas flow to be cleaned. This is because each of the collecting sections in turn is removed from the gas flow during cleaning. Additionally, this system requires a special device for first reducing and then eliminating the voltage in a collecting section during cleaning. It would be desirable to have a simpler cleaning device which did not require the removal of collecting sections during cleaning or changes in precipitator voltage.

There is a need, therefore, for a two-stage electrostatic precipitator capable of handling high particle loadings which includes a cleaning device which uses a small flow of cleaning gas at a very high velocity to effectively remove the dust from the dust collecting plates and which does not require the removal of collecting sections or the shutting down of the precipitator during cleaning.

SUMMARY OF THE INVENTION

Generally, the present invention provides an improved means for removing collected particles from a two-stage electrostatic precipitator while it is operating by means of a relatively small stream of high velocity air or gas. A cleaning device utilizing high velocity gas and having at least one moveable member which moves over the face of the collecting means is provided. This improved means for cleaning can be used in a typical two-stage precipitator or in a precipitator with closely-spaced electrode plates.

Preferably, the present invention uses an assembly of close-spaced electrode plates separated by insulating strips such that they create a plurality of channels in the direction of gas flow having a substantially constant cross-sectional area. The term "plates" refers to any thin, extensive-surface electrodes having sufficient conductivity to maintain the desired voltage gradient across the plurality of channels to precipitate the particles, said "plates" being either flat, cylindrical, or spiral, or of any other shape which permits the maintenance of a reasonably uniform spacing between adjacent "plates".

In a precipitator with closely-spaced electrode plates, a vacuum cleaning device utilizing high velocity air or gas can be used. The vacuum cleaning device has a moveable member which moves over the face of the collecting means through which the high velocity air is drawn while the precipitator is operating. The air is then drawn through a connecting means to a filtering means and then to an air moving means before being discharged either into the atmosphere or into the outlet air. If a lower efficiency filtering means is used, then the imperfectly cleaned air can be discharged into the air stream ahead of the precipitator.

The cleaning device of the present invention uses a high velocity stream of air to clean the collector plates of a two-stage precipitator. This high velocity stream of air is then cleaned by a second air cleaner. To be useful, this second air cleaner must be relatively small compared to the precipitator. This means that the volume of air in the high velocity stream must be small compared to the overall volume of air in the precipitator. For example, in normal operation, the air velocity through a collecting cell of a standard two-stage precipitator is typically about 400 ft/min. The speed of the high velocity cleaning air necessary to remove the collected particles is on the order of 16,000 ft/min or about forty times the normal operating velocity. If the high velocity cleaning air eminates from a nozzle which covers 1/40th of the collecting cell area, the volume rate of flow of the clean air would be the same as the normal rate of flow of the precipitator being cleaned. This in turn would require a secondary air cleaner having the same capacity as the precipitator being cleaned. Such a result is absurd. It is clear that only a very small area of the collecting cell can be cleaned at any given instant in order to have a volume rate of flow of high velocity cleaning air which is small compared to the normal flow rate of the precipitator being cleaned.

The present invention, therefore, utilizes a small stream of high velocity cleaning air which is used to clean only a small portion of the collecting cell at any given instant. The velocity of the cleaning air must be high enough so that the collected particles are removed instantly. There is an optimum gas velocity at which the particles are concentrated into the smallest volume of cleaning gas. This velocity is around 16,000 ft/min. The cleaning device of the present invention has a small nozzle which can move in two directions to traverse the entire area of the face of the collecting cell. The small stream of high velocity cleaning air eminates from the small nozzle.

The high velocity air of the present cleaning device is able to get the plates of the collecting cell clean enough to obtain a high efficiency similar to that obtained immediately after washing the plates with water. Normally, the cleaning device can be operated continuously, even while the precipitator is operating. If low dust loadings are encountered, the precipitator can be shut down for cleaning with the period between cleanings being extended.

Another embodiment of the present invention can be used in a standard two-stage electrostatic precipitator with 0.25 inch spacing and no insulating spacers between the electrode plates. In this embodiment, a jet of high velocity air is blown through the plates from a moveable member positioned over the face of the collecting means. This is because a vacuum cleaning device would have to be too large to draw the required amount of air at high velocity to satisfactorily clean the plates. Typically, the jet of high velocity air is wide compared to the spacing between the plates. The precipitator either can be shut down during cleaning or preferably a second moveable member synchronized with the movement of the first moveable member can be provided which moves over the opposite face of the collecting means to remove the particle laden air of the high velocity jet and convey it to a filtering means for removal while the precipitator is operating. The second moveable member takes in more air than is discharged from the high velocity jet because some mixing of the high velocity jet with the surrounding air occurs.

Other advantages of the invention will become apparent from the detailed description and the accompanying drawings of a presently preferred embodiment of the best mode of carrying out the invention.

DESCRIPTION OF THE PREFERRED EMBODIMENTS

Figure 1:
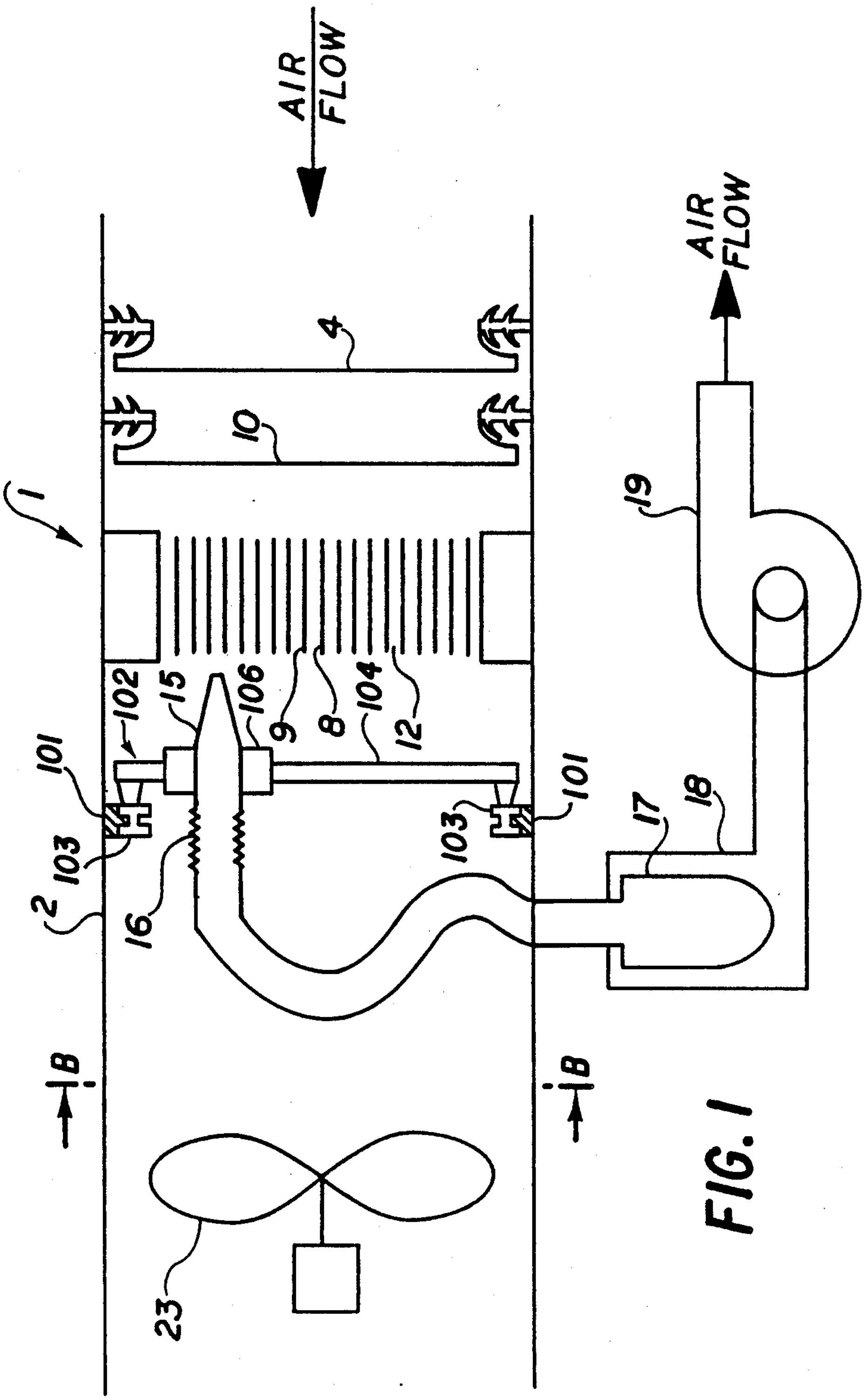
FIG. 1 generally shows a preferred embodiment of the present invention described in this application.

A preferred embodiment of the present invention is shown generally in FIG. 1. The precipitator 1 is enclosed in a housing 2. A fan 3 draws air or gas into the precipitator past the ionizing or corona wire 4 where particles or dust carried by the gas receive an electric charge. The charged particles are then carried between oppositely charged closely-spaced plates 8 and 9 where the electrical field drives the charged particles to the collecting plate 9 which is usually grounded. As shown, the high voltage plates 8 receive a charge or potential from a corona wire 10.

The energizing of the high voltage plates 8 by corona is not limited in any manner by the spacing between plates 8 and 9 of the collecting cell. For instance, corona can be used to charge the high voltage plates of the typical two-stage precipitator described in U.S. Pat. No. 2,129,783 if the high voltage plates extend beyond the grounded plates. In fact, corona can serve as the high impedance to energize any plate or surface which produces an electric field used to drive charged particles toward a collecting surface. Of course the device is not limited to charging the plates with corona as any other known means for energizing the high voltage plates could be used.

To periodically remove the collected particles, a moveable member such as vacuum cleaning nozzle 15 draws air at a high velocity over a small section of precipitator plates 8 and 9. The insulating spacers between adjacent plates 8 and 9 form small channels of substantially constant cross-sectional area. Only a small volume rate of gas flow through the channels is needed to clean them. If plates 8 and 9 are spaced 0.0625 inches apart and nozzle 15 has a cross-sectional area of 0.002 $ft^2$, the volume rate of gas flow through the nozzle will be 32 CFM if the gas velocity through the nozzle is 16,000 ft/min.

This cleaning does not interfere with the normal operation of the precipitator because the gas flow required to effectively clean each of the hundreds of small channels is small compared to the main stream of gas being cleaned. By using a high gas velocity for cleaning, the time required to clean one channel is relatively short As a typical example, a velocity of 16,000 ft/min and a cleaning time of 0.1 second yielded good cleaning results. In a preferred embodiment, the moveable member moves continuously over the outlet face of the collecting cell during normal operation of the precipitator, cleaning approximately one channel at a time.

The high velocity cleaning air removes the collected particles from the precipitator plates and carries them through flexible duct 16 and into particle collecting bag 17 such as a disposable vacuum sweeper bag. The cleaning air passes through the bag into housing 18 and thence to vacuum cleaning fan 19. Alternatively, a filter, a single-stage electrostatic precipitator or any other cleaning device can be used instead of collecting bag 17 for removing the particles from the cleaning air. The cleaning air passes through fan 19 and is discharged into the atmosphere. Alternatively, the cleaning air can be returned to the air flow ahead of the precipitator.

Figure 2:
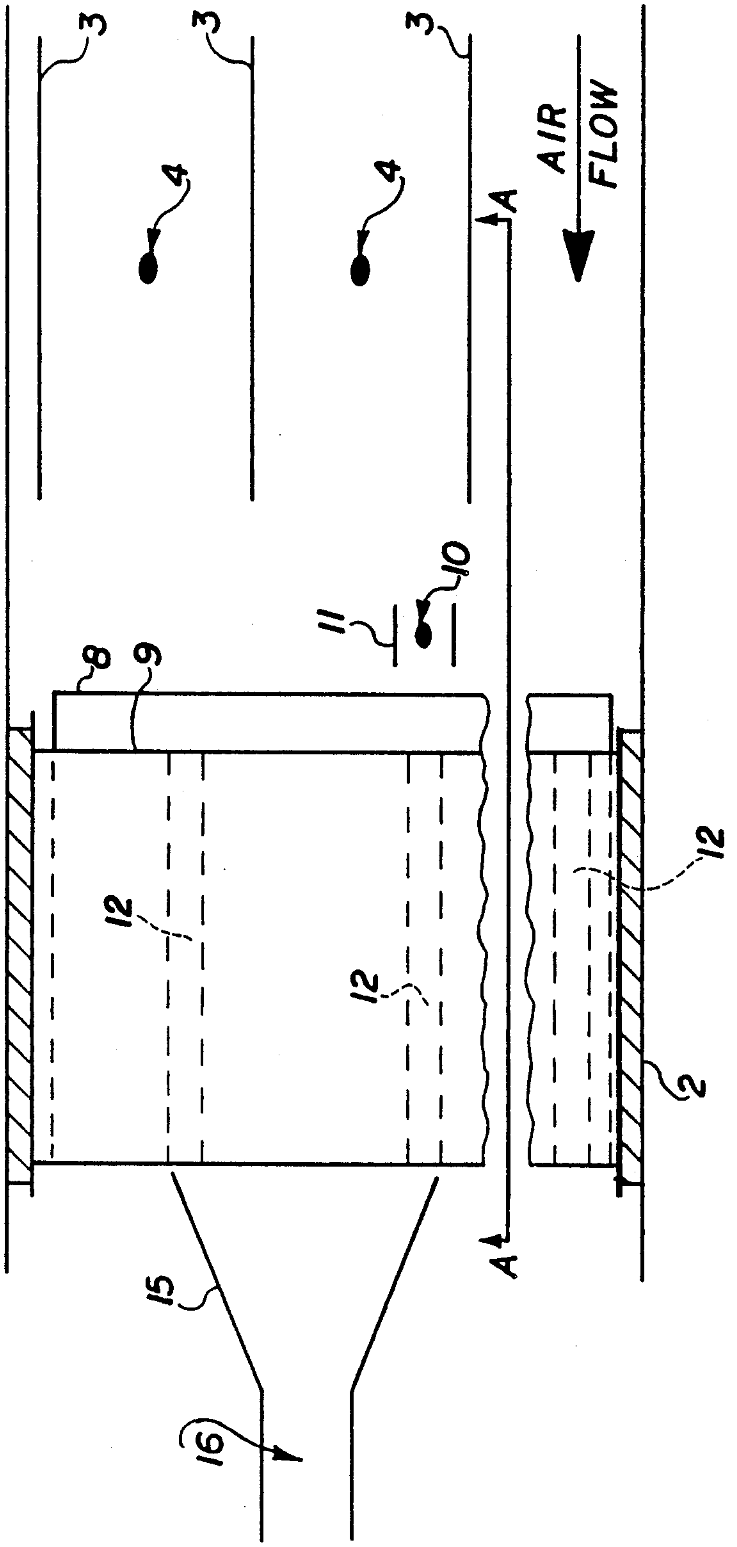
FIG. 2 shows a close-up of the nozzle and precipitator plates of a collecting cell.

FIG. 2 shows a top view of the preferred arrangement of the cleaning nozzle, the closely spaced plates and the corona wires. Gas first passes through the ionizing means consisting of corona wires 4 and grounded plates 3 and the through the collecting cell. The high velocity cleaning air is drawn through nozzle 15. In a preferred embodiment, high voltage plates 8 protrude in the direction of corona wire 10 about 0.25 inches further than grounded plates 9. This is to facilitate the charging of high voltage plates 8 without drawing current to grounded plates 9. Typically corona wire 10 is operated at a voltage of approximately 8 KV and is spaced 0.25 inches to 0.3125 inches from the protruding edge of high voltage plates 8 in order to give the desired voltage on high voltage plates 8 within the range of 0.5 –6.0 KV.

Figure 3:
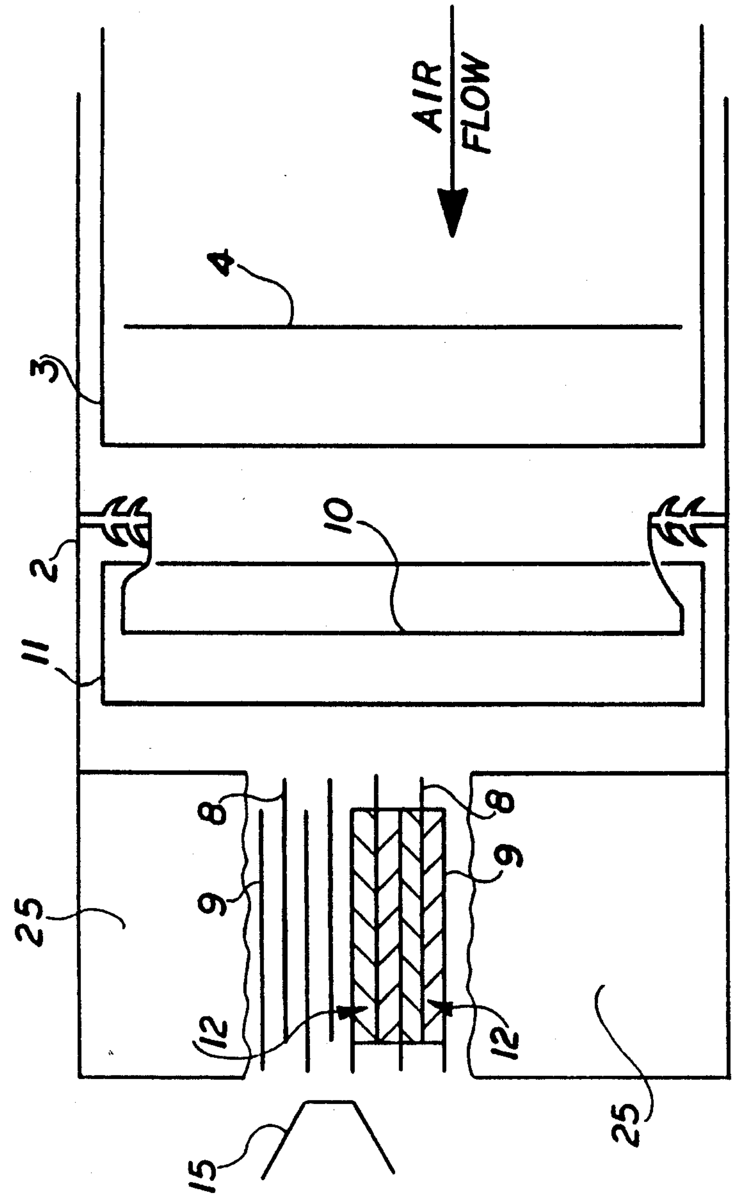
FIG. 3 shows a side view along line A—A of the embodiment in FIG. 2.

Referring to FIG. 3, high voltage plates 8 and grounded plates 9 are spaced apart by insulators 12. Corona wire 10 is relatively close to high voltage plates 8 such that plates 8 are energized by ions from wire 10 and yet almost none of these ions reach grounded plates 9. Grounded plates 11 shield wire 10 from surrounding potentials and control the corona from wire 10. Grounded plates 3 are the conventional grounded plates used with the particle charging corona wires 4 in the ionizing means. Similarly, nozzle 15 is placed in close proximity to plates 9 as shown in FIG. 3 so that the cleaning air is preferably pulled from only a few of the plates 8 and 9 at any one time.

Figure 4:
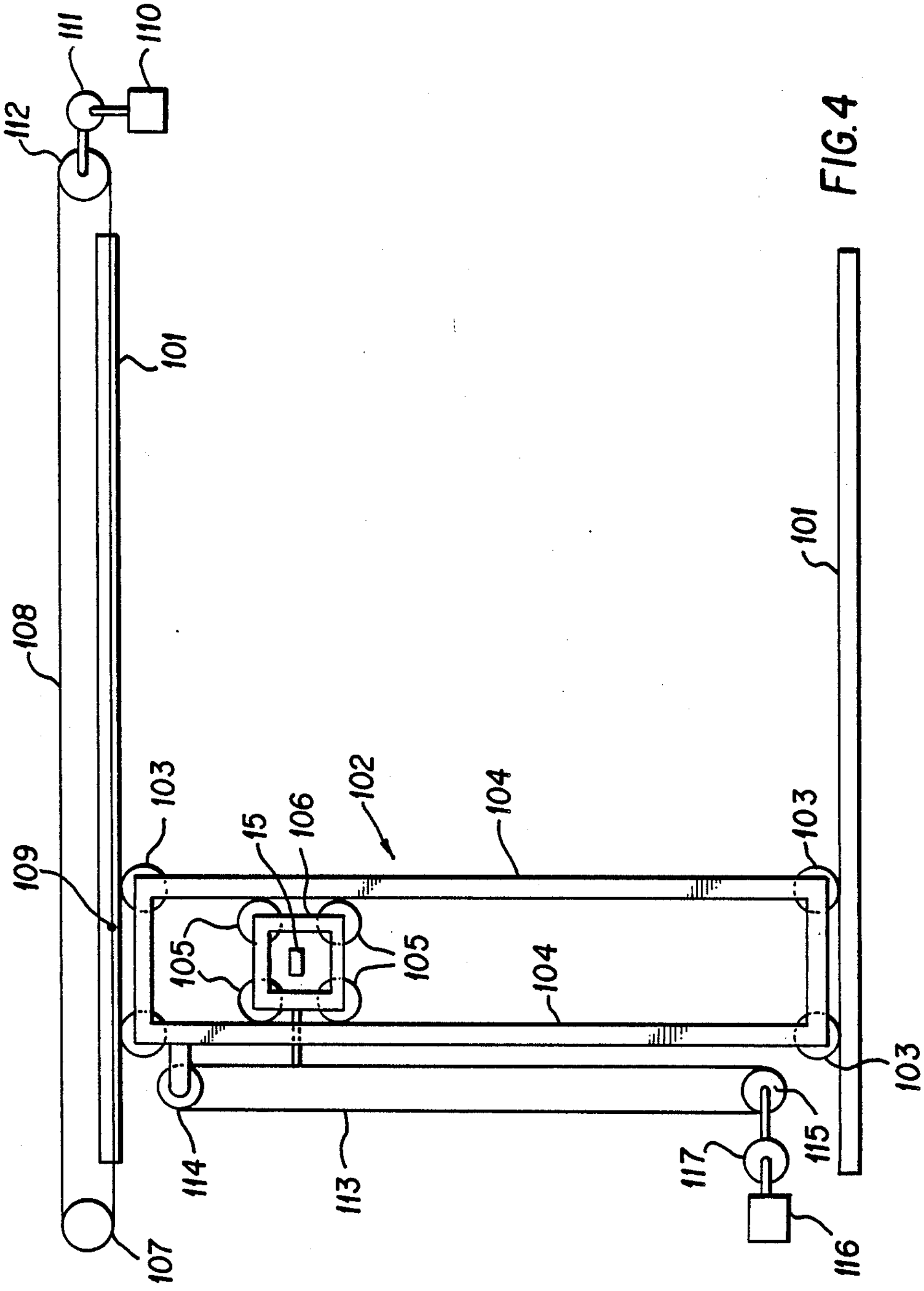
FIG. 4 shows an end view of the cleaning device along line B—B of the embodiment shown in FIG. 1.

FIG. 4 shows a preferred embodiment of the mechanism for moving cleaning nozzle 15 over the face of the collecting cell of a two-stage electrostatic precipitator. The mechanism moves cleaning nozzle 15 in two directions, namely the horizontal and vertical directions. In this embodiment, a pair of rails 101 are mounted to the top and bottom of housing 2. Four wheels 103 roll on rails 101 which act as guides for the horizontal movement of cleaning nozzle 15. Preferably wheels 103 have grooves in them which fit around a protrusion on rails 101. Two wheels are mounted on each rail. It is evident that other guide systems could be used which enable nozzle 15 to move in a horizontal direction along rails 101.

Mounted on wheels 103 is a rectangular frame 102 which acts as a guide for the vertical movement of cleaning nozzle 15. The vertical portions of frame 102 are preferably rails 104 which are similar to rails 101. Four wheels 105 roll on rails 104 which act as guides for the vertical movement of cleaning nozzle 15. Preferably wheels 105 have grooves in them which fit around a protrusion on rails 104, just like wheels 103 fit on rails 101. It is evident that other guide systems could be used which enable nozzle 15 to move in a vertical direction along rails 104.

Mounted on wheels 105 is another rectangular frame 106 to which cleaning nozzle 15 is attached. Preferably, cleaning nozzle 15 is mounted in the center of frame 106. Cleaning nozzle 15 is attached to flexible duct 16 which bends and stretches as frame 106 moves up and down and, as frame 102 moves from side to side, thereby, enabling cleaning nozzle 15 to be moved over the entire area of the face of the collecting cell.

A cable or chain 108 is attached to frame 102 at the center of the upper horizontal member 109. Cable 108 is conveyed over pulleys 107 and 112. Pulley 112 is driven by motor 110 through geared drive 111. Cable 108 moves frame 102 horizontally along rails 101. Similarly, cable or chain 113 is attached to frame 106 and moves it vertically. Cable 113 is conveyed over pulleys 114 and 115. Pulley 115 is driven by motor 116 through geared drive 117. Cable 113 moves frame 106 vertically along rails 104. Motors 110 and 116 are controlled by a drive circuit or microprocessor so that the nozzle moves in an orderly fashion over the entire face of the collecting cell in the required amount of time.

The size of the cleaning nozzle is critical to the velocity of the cleaning air. The smaller the nozzle, the higher the velocity for a given volume of air. However, the reduction in the size of the nozzle is limited by the spreading of the high velocity air stream. For vacuum cleaning the air must be confined through the area to be cleaned. Thus vacuum cleaning is possible for the closely space construction shown in FIG. 1. In this case a typical channel is ⅛" by 2". At 16,000 ft/min, the volume rate of air flow is 56 CFM which is in the range of a typical household vacuum sweeper bag.

One problem which may develop with vacuum cleaning in the closely spaced construction shown in FIG. 1 is that a negative high pressure may tend to collapse the space between the closely spaced plates being cleaned. Normally this would require increased strength in the plates such as by using heavier aluminum. However, this would dramatically increase the cost of the collecting cell and the precipitator. A more economical way to reduce the stress which tends to collapse the space is to spread the difference in pressure over the adjacent spaces, thereby reducing the stress on any given plate. Moreover, since the suction is proportional to the square of the velocity, the reduction in pressure is much greater than a reduction in velocity.

Figure 5:
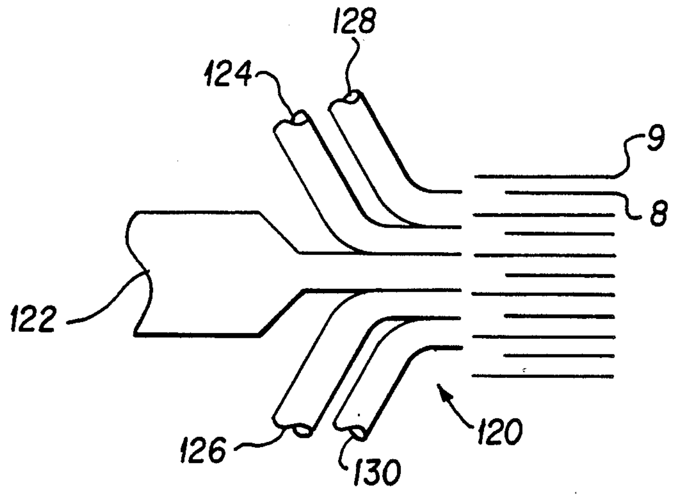
FIG. 5 shows a vacuum nozzle which reduces the pressure on adjacent plates.

On such way of reducing the pressure or suction on the two sides of a given plate is to use a multiple opening nozzle 120 such as the one shown in FIG. 5 connected to a multistage fan. The different sections of nozzle 120 are connected to the various stages of the fan which have different amounts of suction. The center section 122 of the nozzle 120 is connected to the full suction of the fan and is used to clean the central two spaces over which the nozzle is located. The adjacent spaces are overlapped by the middle sections 124 and 126 of nozzle 120 which are connected to the next highest suction stage of the fan. Outside sections 128 and 130 of nozzle 120 are connected to the lowest suction stages of the fan. By increasing the number of stages in the fan and the number of openings in the nozzle, the pressure across any given plate is reduced. The number of stages used in an engineering choice balancing the reduction in stress against the complexity of the system.

The system just described for reducing the suction on the plates can become quite complex. A more simplified system could utilize one fan and a nozzle having various flow restrictions in it. The restrictions in the nozzle are used to reduce the pressure in the sections adjacent to the one being cleaned. Preferably the restrictions are in the form of a perforated plates through which the air must pass. There is no restriction in the central section but as one moves toward the outer edge of the nozzle there are more and more restriction. This simplified arrangement does have one drawback, however, it requires a more powerful fan.

In either of these constructions for reducing the suction on the plates, only the center section and the sections on the leading side of the nozzle need to be connected to the secondary air cleaner. The trailing sections of the nozzle which are passing over cleaned spaces can be connected directly to the fan and need not be connected to the secondary air cleaner. Not only does this reduce the size of the secondary air cleaner but it also reduces the size of the fan.

A typical collecting cell in a commercial two-stage electrostatic precipitator is 18" by 18" in cross section and 10" deep in the direction of air flow and is rated at 900 to 1,000 CFM. Several of these cells can be assembled in parallel to handle the desired air flow. It is not usually feasible to vacuum clean this type of cell because of the large volume of cleaning air required and the relatively large size of the cleaning device. However, it can be successfully cleaned by blowing a high velocity jet through the collecting cell, provided that the jet fills the ¼" space and is wide as compared to ¼". In this case each channel to be cleaned is ¼"×18" in cross section. A nozzle that is 3/8" ×2" has a cross sectional area of 0.75 in.$^2$. With a cleaning velocity of 16,000 ft/min an air flow of only 83 CFM is required. A nozzle of this size has been successfully used in the present invention.

If the precipitator has only one collecting cell which is being cleaned, the secondary air cleaner would have a capacity of 1/11th or 1/12th of the rating of the cell being cleaned. But if the precipitator has 10 collecting cells in parallel which are being cleaned by the same nozzle, then the secondary air cleaner could be less than 1/100th of the capacity of the precipitator.

In order to clean a large precipitator in a reasonable time, a given location must be cleaned quickly and efficiently. If the cleaning air has a velocity of 16,000 ft/min, the particles are removed effectively and quickly, typically in 0.1 seconds. For the ⅜" by 2" nozzle described above, moving continuously over the outlet face of the collecting cell, perpendicular to the plates, the ¼" space between the plates is filled for only half of the time. Thus the nozzle should move at 1.25 in/sec.

There must be some overlap of the nozzle with the channel or space between the plates because of the spreading of the air stream. For a 2" wide nozzle there might be ½" of overlap. Thus the effective area cleaned in one pass is only 1 ½" wide. A nozzle moving perpendicular to the plates at 1.25 in/sec covers the 18" of a collecting cell in 15 sec. With 12 passes per collecting cell and 15 seconds per pass only 3 minutes are required to clean one collecting cell. One nozzle, therefore, could clean 10 collecting cells in 30 minutes. Thus 9,000 to 10,000 CFM of electrostatic precipitator capacity can be cleaned every 30 minutes by only 83 CFM of cleaning air. This means that a secondary air cleaner that is less than 1/100th of the capacity of the precipitator being cleaned can be used to remove the particles from the cleaning air.

For larger capacity two-stage electrostatic precipitators, a larger nozzle is desirable. A 2"×¼" nozzle would keep the ¼" space between the plates full all of the time, and therefore, could move ¼" in 0.1 second or 2.5 in/sec. This is twice as fast as the 2"×⅜" nozzle and would be desirable provided the precipitator is large enough. If the precipitator were still larger, a 6"×½" nozzle would be desirable.

Figure 6:
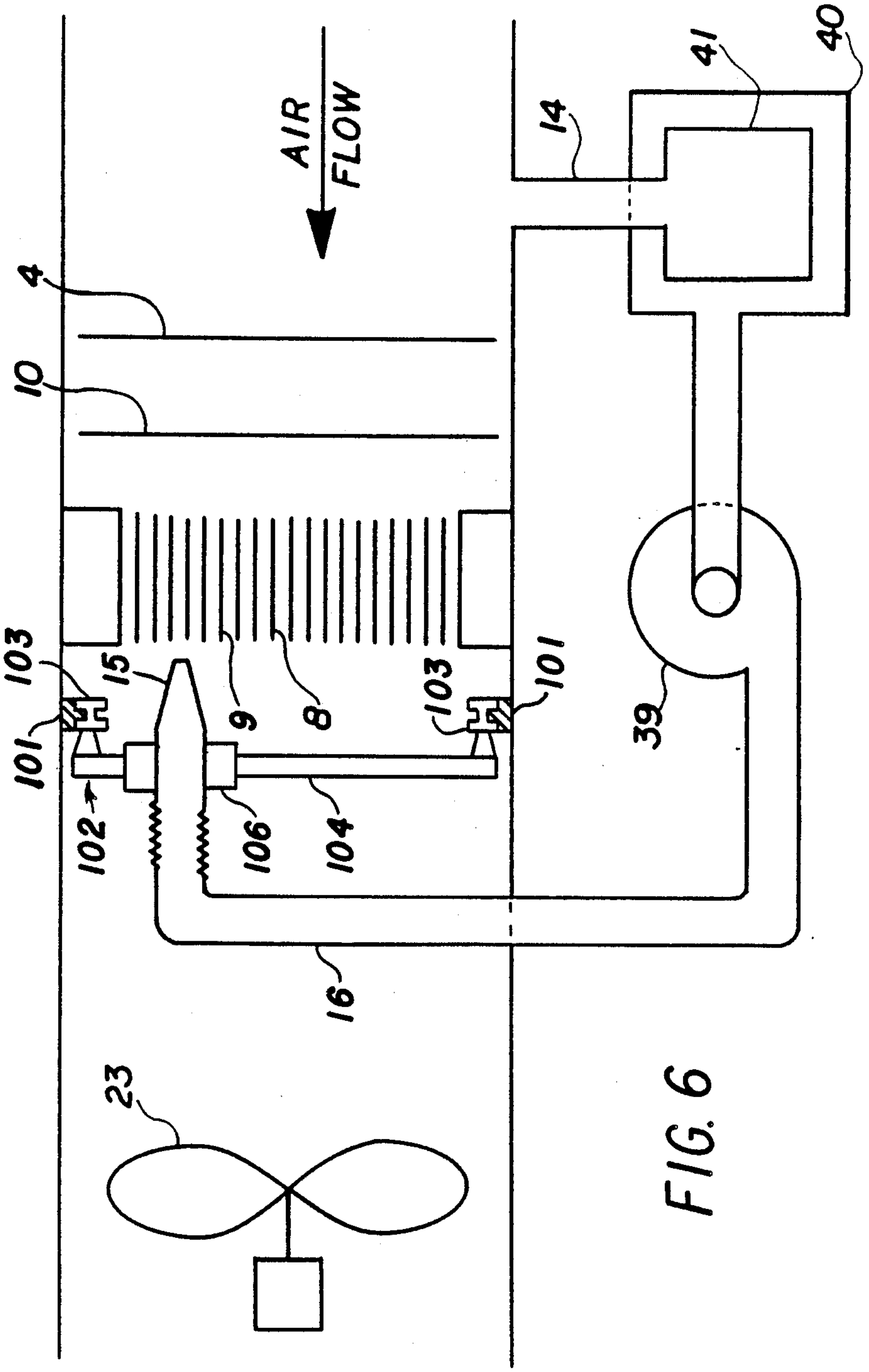
FIG. 6 shows the cleaning means arranged to blow air through the precipitator plates.

Experience indicates that sometimes particles and lint may collect on the leading edge of plates 8 and 9 in FIG. 1. Vacuum cleaning, even with high velocity air may be unable to remove all of these particular obstructions. Thus, it is desirable to provide the precipitator with the capability of blowing high velocity air through the plates, as shown in FIG. 6. To do this, fan 3 is stopped, shutting down the precipitator. Fan 39 is used to blow air through flexible duct 16 and out of nozzle 15. The particle laden air is then drawn by fan 39 through duct 14 into housing 40. Collecting bag 41 collects the particles but allows the clean air to pass through to fan 39. If there are particles stuck to the plates which cannot be removed by using just high velocity air, solid or liquid particles such as small plastic pellets can be injected into the high velocity air to help remove any adherent materials stuck to the plates.

This method of cleaning by blowing is not limited to close-spaced precipitators. A sufficiently confined stream of cleaning air can also be obtained by blowing a high velocity jet of air through the 0.25 inch standard-spaced collecting plates having no separating spacers as long as the jet is wide as compared to the plate spacing so as to maintain a high velocity at the center of the air stream throughout the entire length of the collecting plate. A larger stream of cleaning gas is required in the standard-spaced cell than in the close-spaced cell but only one nozzle is required for either type of precipitator. Another suitable nozzle for the standard-spaced collecting cell would be 6 inches by 0.375 to 0.5 inches. There will be some spreading of the high velocity jet so that some overlap of successive passes is desirable. For example, with a 6" nozzle width, a 1" overlap on successive passes is desirable. Although a relatively wide nozzle is preferred, good cleaning results have been obtained with a nozzle only 2"×0.5" and with a 0.5 inch overlap on successive passes.

A nozzle 15 for blowing gas through the plates is illustrated in FIG. 6. When blowing the high velocity cleaning air through the plates, the spacing between the nozzle and the outlet face of the collecting cell is not as critical as in the vacuum cleaning described previously in this application. Good operation has been achieved with blowing nozzle 15 spaced 0.5 inches from the outlet face of the collecting cell.

Figure 7:
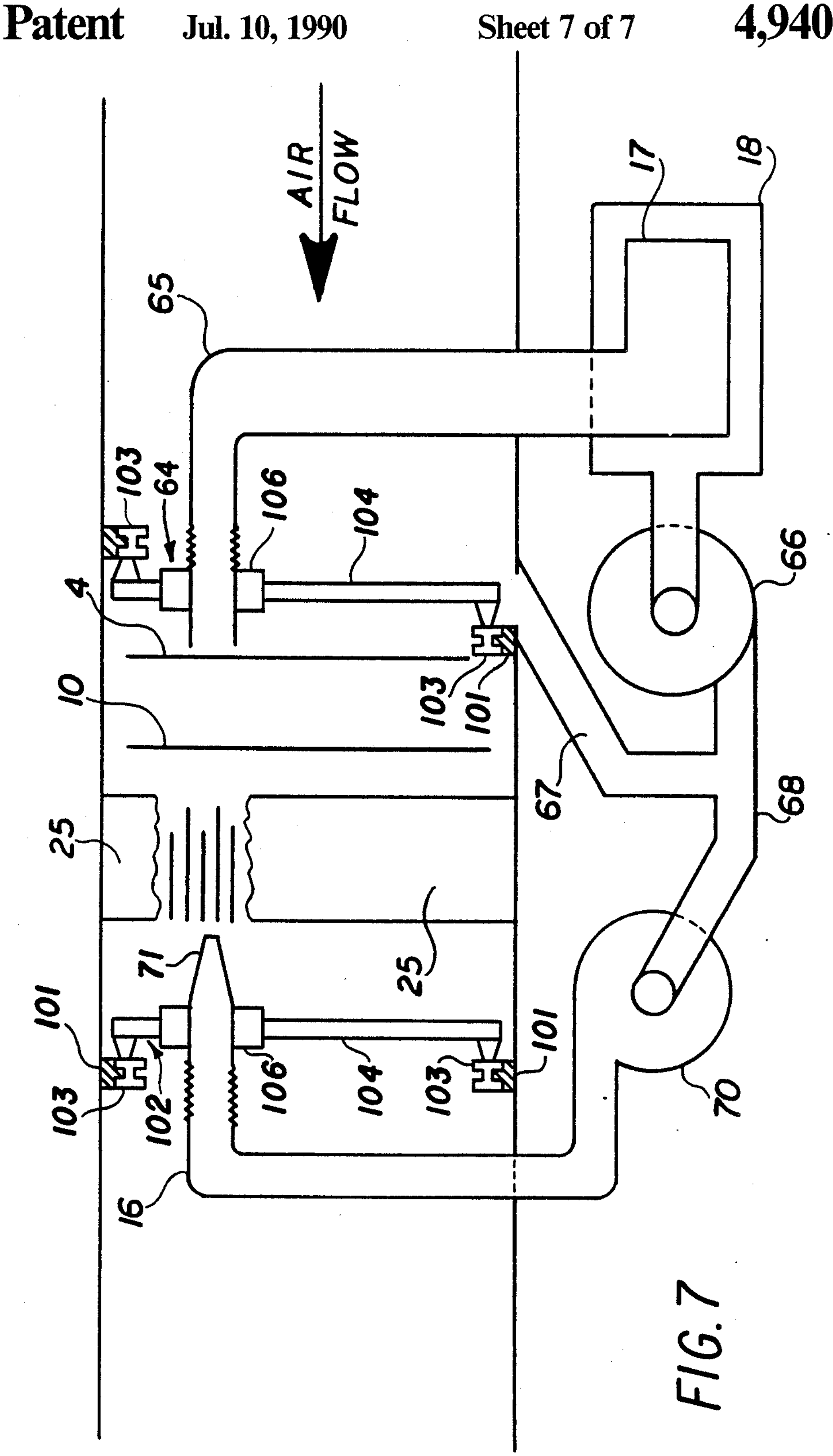
FIG. 7 shows the first moveable member of the cleaning means arranged to blow air through the precipitator plates and into the second moveable member.

As shown in FIG. 6, the precipitator is intended to be shut down during this cleaning operation. An arrangement for cleaning either the standard or close-spaced precipitator, by blowing high velocity air while the precipitator is operating is shown in FIG. 7. This shows a second moveable member 64 positioned ahead of the collecting cell to collect the high velocity stream of gas from the first moveable member, i.e. nozzle 71. The movement of the second moveable member is synchronized with the movement of nozzle 71 over the face of the collecting cell. The mechanisms for moving nozzle 71 and member 64 is similar to that shown in FIG. 4 for nozzle 15.

Since there will be some mixing of the high velocity jet with the surrounding gas, second moveable member 64 must collect a larger volume of gas than that issuing as the high velocity jet from nozzle 71. To achieve this, one fan 66 is used to draw the particle laden air collected by second moveable member 64 through flexible connector 65 and pass it through a second gas cleaning device such as is shown and described in FIG. 1. A second fan 70 then draws a part of this cleaned gas through connector 68 and blows it through cleaning nozzle 71. Preferably, the remaining cleaned gas is returned through connector 67 to the air flow ahead of the precipitator.

In one preferred embodiment, similar to that shown in FIG. 2, the close-spaced collecting cell is 24"×30"×2" and can handle 3,000 CFM of air. The collecting cell is made from individual units which are 6"×6"×2". These units have alternating high voltage plates 8 and grounded plates 9 which are spaced 0.0625 inches apart by insulating strips 12 of plexiglass. The plexiglass strips and the plates form small channels of uniform cross-sectional area.

A prototype of the individual unit described above has been constructed and some preliminary tests performed. A standard-spaced precipitator has a face velocity at the collecting cell of 300–400 ft/min. The prototype unit of the close-spaced collecting cell was successfully operated at 600 ft/min and it appears that 800–1000 ft/min is possible. The close spacing of the plates reduces the Reynolds number for the precipitator and the corresponding reduction in turbulence makes higher face velocities feasible.

The prototype close-spaced collecting cell was tested for its efficiency using welding smoke. The particulates in welding smoke are submicron in size. The precipitator was operated in the normal precipitating mode and then shut down for cleaning. A vacuum cleaning nozzle was then manually moved over the outlet face of the individual collecting unit.

The cleaning nozzle was slightly larger than one channel, and could be moved so that one channel was always being cleaned. The velocity of the cleaning air through the nozzle and channel was between 8,000 ft/min and 16,000 ft/min with the volumetric flow being between 25 CFM and 50 CFM. There does not appear to be any reason why a higher velocity could not be used. The precipitator was restarted after cleaning and this process was repeated several times.

The efficiency for the prototype unit as measured by both a filter discoloration test and a charge carrying ability test was at least 99%. This compares to the normal efficiency of a two-stage electrostatic precipitator in the ventilating field of 95%. With a 99% efficiency, the close-spaced precipitator can operate with several plates short circuited before its efficiency will be seriously impaired. The vacuum cleaning helps maintain the high efficiency by preventing a thick layer of particles from accumulating on the precipitator plates and causing reintrainment of particles or blow-off.

While a presently preferred embodiment of the invention has been shown and described, it may be otherwise embodied within the scope of the appended claims.

What is claimed is:

1. A two-stage gas-cleaning precipitator comprising:

(a) an ionizing stage for charging a plurality of particles;

(b) a means for causing a gas to pass first through the ionizing stage and then through a collecting stage, the collecting stage comprising a plurality of alternating high and low voltage collecting plates;

(c) a means for energizing the high voltage plates to create an electric field for precipitating the charged particles; and (d) a means for cleaning the collecting stage comprising a means for generating a small stream of high velocity gas, a moveable member for directing the small stream of high velocity gas between individual collecting plates to dislodge the collected particles, a means for moving the moveable member over the outlet face of the collecting stage, and a means for conveying the small stream of high velocity gas containing the dislodged particles to a particle collecting means.

2. A two-stage gas-cleaning precipitator as described in claim 1 wherein the means for cleaning the collecting stage further comprises:

(a) a means of moving the moveable member over the outlet face of the collecting cell in two directions, both of which are perpendicular to the direction of gas flow through the collecting cell;

(b) a means for generating a small stream of high velocity gas; and (c) a flexible means for connecting the moveable member with the means for generating a small stream of high velocity gas.

3. A two-stage gas-cleaning precipitator as described in claim 2 wherein the means for cleaning the collecting stage further comprises:

(a) a second moveable member placed in front of the inlet face of the collecting stage and directly opposite of the first moveable member;

(b) a means of moving the second moveable member in synchronization with the first moveable member so that the second moveable member collects the small stream of high velocity gas emanating from the first moveable member; and (c) a means for connecting the second moveable member to a particle collecting means.

4. A two-stage gas-cleaning precipitator as described in claim 3 wherein the particle collecting means comprises a filter.

5. A two-stage gas-cleaning precipitator as described in claim 2 further comprising a collecting stage having a plurality of insulating spacer means for holding successive collecting plates in a close-spaced relationship, the spacer means being disposed at spaced intervals to form a plurality of channels in the direction of gas flow having a substantially constant cross-sectional area, the plurality of channels being sufficient in number that the gas flow through one channel is small compared to the gas flow through the close-spaced collecting means.

6. A two-stage gas-cleaning precipitator as described in claim 5 wherein the small stream of high velocity gas is generated by a vacuum means which pulls particle laden air into the moveable member.

* * * * *